United States Patent [19]

Bowman

[11] Patent Number: 4,554,678
[45] Date of Patent: Nov. 19, 1985

[54] WIRELESS RECEIVER HAVING CRYSTAL FILTER AT OUTPUTS OF PREAMPLIFIER

[75] Inventor: George A. Bowman, Vernon Hills, Ill.

[73] Assignee: Honeywell Inc., Minneapolis, Minn.

[21] Appl. No.: 449,349

[22] Filed: Dec. 13, 1982

[51] Int. Cl.[4] .............................................. H04B 1/26
[52] U.S. Cl. .................................... 455/286; 455/291; 455/293; 455/333; 455/340; 333/192
[58] Field of Search ............... 455/280, 283, 286, 291, 455/293, 193, 333, 334, 341, 284, 339, 340; 330/277; 333/192

[56] References Cited

U.S. PATENT DOCUMENTS

| | | |
|---|---|---|
| 2,054,757 | 9/1936 | Lamb . |
| 2,266,658 | 12/1941 | Robinson . |
| 2,296,882 | 9/1942 | Toth . |
| 2,405,999 | 8/1946 | Collar et al. . |
| 2,714,157 | 7/1955 | Boelens . |
| 3,388,338 | 6/1968 | Austin .................................. 330/277 |
| 3,404,347 | 10/1968 | Kaplan et al. ........................ 330/277 |
| 3,633,134 | 1/1972 | Barrows et al. ..................... 333/192 |
| 3,641,434 | 2/1972 | Yates et al. . |
| 4,052,674 | 10/1977 | Miyamoto . |
| 4,053,717 | 10/1977 | Snider . |
| 4,112,377 | 9/1978 | Tanner et al. . |
| 4,263,676 | 4/1981 | Liebel . |
| 4,267,604 | 5/1981 | Sato ...................................... 455/193 |
| 4,369,518 | 1/1983 | Olson .................................. 455/286 |

Primary Examiner—Jin F. Ng
Attorney, Agent, or Firm—Trevor B. Joike

[57] ABSTRACT

A wireless superheterodyne receiver is provided having an antenna for receiving wireless transmissions, a preamplifier having an input connected to the antenna and an output, a crystal filter having an input connected to the output of the preamplifier and an output, a demodulator having an input connected to the output of the filter, the demodulator having a single mixer, an oscillator having a second crystal connected to the single mixer of the demodulator wherein the demodulator supplies at an output a demodulated signal based upon the wireless transmissions.

13 Claims, 2 Drawing Figures

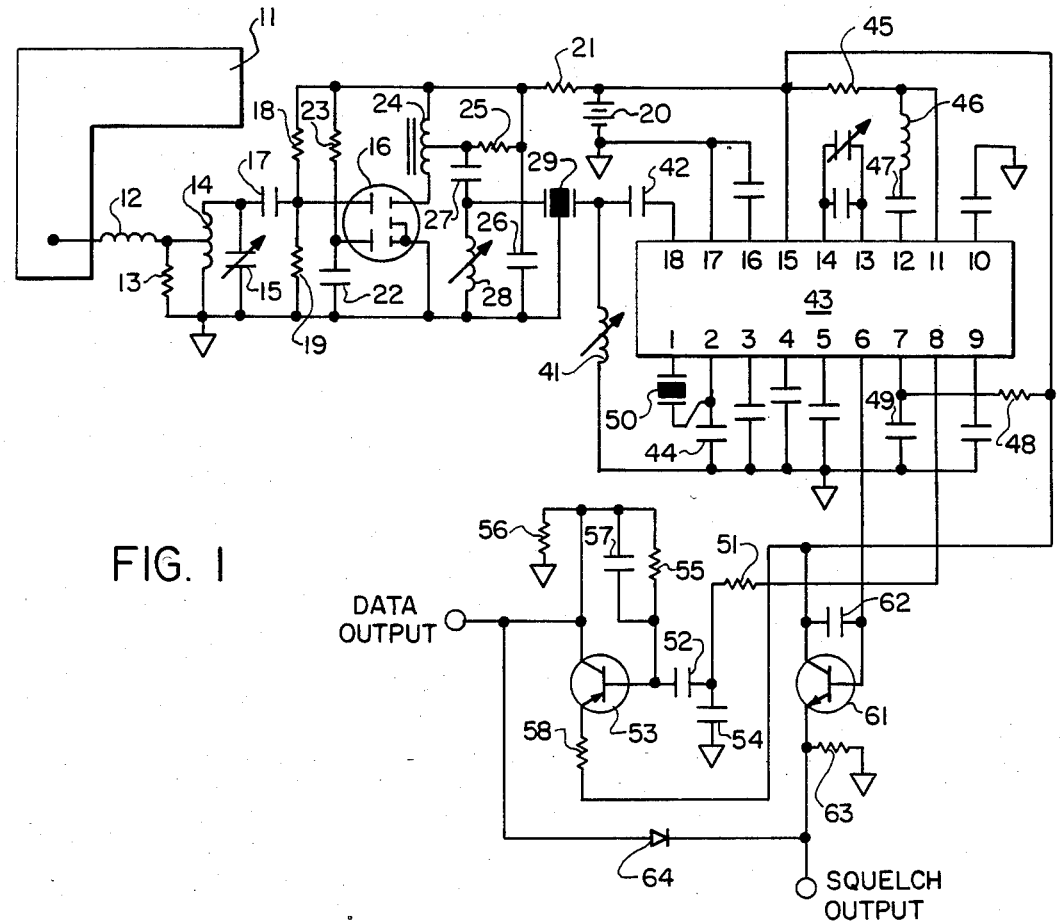
FIG. 1
DATA OUTPUT
SQUELCH OUTPUT
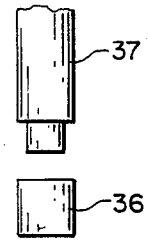
FIG. 2
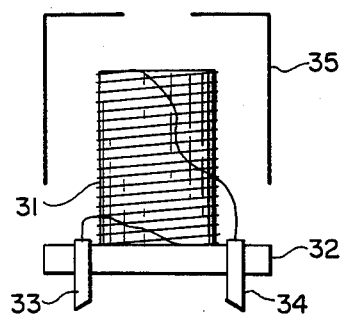

WIRELESS RECEIVER HAVING CRYSTAL FILTER AT OUTPUTS OF PREAMPLIFIER

BACKGROUND OF THE INVENTION

The present invention relates to wireless superheterodyne receivers and, more particularly, to superheterodyne receivers which have a crystal filter connected to the output of a preamplifier for filtering out undesired frequencies and a demodulator having a single mixer supplied by an oscillator having a second crystal, the oscillator signal mixing with the received signal for yielding a desired intermediate frequency.

Generally, wireless receivers come in two basic varieties, superregenerative and superheterodyne. The superregenerative receiver, which may for example consist of a simple one transistor RF receiver, has the advantages that it consumes very little power and can be made extremely sensitive. However, it is not an optimum choice in terms of noise rejection and temperature drift, and it can radiate broad band RF energy back out of the antenna.

By contrast, superheterodyne receivers are typically more complex, consuming greater amounts of power. They typically require two mixers for their operation which increases complexity and power usage. Such receivers, however, can find many uses if they can be made small, if they do not suffer from temperature drift problems, if they do not radiate broad band RF energy back into the antenna and if they can be made to reject noise.

For example, in today's building automation systems, a central station is connected over a transmission channel to a plurality of remote stations which are then wired to various sensors and control loads. The remote stations can be made somewhat independent of the central station by including intelligent processors for performing tasks on their output loads based upon inputs that they receive from their sensors, other tasks of the control system being performed by the central station.

Installation complexity and cost can be greatly reduced if the sensors and control loads, which are normally wired to the remote stations, can communicate with the remote stations instead by wireless transmissions. Since it may be desirable for certain of these sensors and/or control loads to be battery operated, it is necessary that the wireless receivers, which would have to be included in the control loads and/or sensors, use a minimum amount of power. Furthermore, the size of the receiver must be small thereby necessitating a simple receiver and the receiver must be designed for optimum noise rejection, minimum temperature drift and minimum radiation of the broad band RF energy back out of the antenna. A single mixer superheterodyne receiver can be made to fulfill these requirements operated at very low power levels.

SUMMARY OF THE INVENTION

The present invention solves many of these problems and achieves many of these results by including an antenna for receiving wireless transmissions, a preamplifier having an input connected to the antenna and an output, a crystal filter having an input connected to the output of the preamplifier and an output, a demodulator having an input connected to the output of the filter, the demodulator having a single mixer, an oscillator having a second crystal connected to the single mixer of the demodulator wherein the demodulator supplies at an output a demodulated signal based upon the wireless transmission.

BRIEF DESCRIPTION OF THE DRAWINGS

These and other features and advantages will become more apparent from a detailed consideration of the invention when taken in conjunction with the drawings in which:

FIG. 1 shows a schematic diagram of the receiver according to the present invention; and, FIG. 2 shows a helical tuning coil useful in the receiver shown in FIG. 1.

DETAILED DESCRIPTION

In FIG. 1, antenna 11 is connected through loading coil 12 to resistance 13 which is connected between loading coil 12 and circuit common. Resistor 13 is designed to match the impedance of the antenna. The junction of loading coil 12 and resistance 13 is connected to a tap of coil 14 having a variable capacitor 15 connected in parallel thereto. Tuning coil 14 and capacitor 15 form a tank circuit which acts as a step up transformer to match the antenna impedance to the input impedance of MOSFET 16 which forms a preamplifier. One side of the parallel arrangement of coil 14 and capacitor 15 is connected to circuit common and the other side is connected to one side of capacitor 17 the other side of which is connected to the first gate of MOSFET 16. Capacitor 17 acts as a bypass capacitor. Resistors 19, 18 and 21 are connected in series between circuit common and direct current voltage source 20. The junction of resistors 18 and 19 is connected to the first gate of MOSFET 16 to bias that gate for providing the proper voltage for yielding the best noise figure. The second gate of MOSFET 16 is connected to the junction of capacitor 22, which has its other side connected to ground, and resistor 23, which has its other side connected to the junction of resistors 18 and 21. Resistor 23 and capacitor 22 also provide the proper voltage to yield the best noise figure for MOSFET 16.

The source of MOSFET 16 is grounded and the drain is connected to one side of toroid transformer 24 the other side of which is connected to the common junction of resistors 18, 21 and 23. Coil 24 is an output load coil for the MOSFET and acts as an isolation transformer for the succeeding stations. Both coils 14 and 24 act to stabilize the receiver with high gain. Moreover, the source of MOSFET 16 is grounded to increase stability.

The tap of toroidal coil 24 is connected to circuit ground through resistance 25 and capacitor 26. The junction of resistor 25 and capacitor 26 is also connected to the common junction of resistors 18, 23 and 21. The tap of coil 24 is also connected to circuit ground through capacitor 27 and variable inductance 28. Inductor 28 and capacitor 27 match the impedance of the output of MOSFET 16 with the input impedance of crystal 29 which filters out all frequencies except the desired frequency. Capacitor 27 and inductor 28 also resonate at the transmitted frequency. Capacitor 27 also blocks DC and permits RF only to crystal filter 29.

Since crystal filter 29 has a high input impedance which may, for example, be on the order of 3600 ohms, conventional LC networks do not have sufficient Q to match impedances efficiently. Therefore, to obtain low transmission loss, inductor 28 is constructed as a helical tuning coil as shown in FIG. 2. Thus, the helical tuning coil comprises coil 31 wound around a suitable support such as a phenolic form which is attached to board 32 having posts 33 and 34 suitably connected to the ends of the coil. Surrounding coil 31 is a can 35 having a suitable opening on top to allow a tuning slug 36 to be inserted through the can and within the form around which coil 31 is wound. A tuning driver 37 is next inserted through the can and into the form for proper tuning. After tuning is done, the tuning driver 37 is removed.

A similar inductor-capacitance circuit formed by inductor 41 connected from the other side of crystal 29 to ground and capacitor 42 connected from the junction of crystal 29 and inductor 41 to pin 18 of demodulator/receiver 43 is designed to impedance match the output impedance of crystal 29 to the demodulator/receiver 43. Coil 41 may also be constructed according to the arrangement shown in FIG. 2.

Demodulator/receiver 43 may be a Plessey SL6600C. It contains a preamplifier, a mixer, an RF amplifier, a phase lock loop detector, a squelch gate, and a post-detection amplifier for frequency modulation detection. A second crystal 50 is connected between pins 1 and 2 which, together with capacitor 44 connected from pin 2 to ground, acts as an oscillator for providing a desired frequency to the mixer of demodulator/receiver 43. This mixer mixes the oscillating signal from oscillator 43-44 with the incoming frequency as filtered by first crystal 29 to produce a desired intermediate frequency for use by demodulator/receiver 43. Pins 3, 4, 5, 9 and 10 are suitably connected to ground through corresponding bypass capacitors. Pins 18, 17 and 15 are the input, ground and supply pins respectively, pin 18 being connected through capacitor 42 to the output of crystal 29, pin 17 being tied directly to ground, and pin 15 being connected directly to source 20. A parallel capacitor arrangement is connected to pins 13 and 14 in order to assure the natural frequency of the phase lock loop oscillator internal to the demodulator/receiver 43 under no signal conditions is maintained at the desired intermediate frequency. Source 20 is connected through resistance 45 directly to pin 11 and is also connected through resistor 45 and then through serially connected inductor 46 and capacitor 47 to pin 12 to form the loop filter of the phase lock system. Source 20 is also connected through resistor 48 and capacitor 49 to ground, the junction of capacitor 49 and resistor 48 being connected to pin 7. Resistor 48 and capacitor 49 form the squelch threshold circuit for the demodulator/receiver 43. If the incoming signal is below the threshold, pin 6 goes to the supply potential. Otherwise, pin 6 is at ground potential.

To produce high sensitivity by rejecting noise outside the extremely narrow receiver bandwidth, the most common approach which has been taken by the prior art is to use a dual superheterodyne receiver. However, the dual superheterodyne receiver is complicated, expensive, and hard to tune requiring the use of at least two crystals and two mixers. Dual superheterodyne receivers are not energy effective because they consume too much battery power to feed two mixers. The receiver of FIG. 1 has reduced substantially power consumption while reducing complexity and expensiveness and easing the task of tuning by utilizing only one mixer and one filter for that mixer. The receiver of FIG. 1 still provides the required sensitivity and noise rejection as does a dual superheterodyne receiver.

Moreover, by moving crystal filter 29 to the output of MOSFET 16 rather than its input, tuning is made much easier because the crystal filter can ignore the antenna's coupling impedance to the indoor space. The preamplifier formed by MOSFET 16 isolates the antenna from the filter. Therefore, tuning of the filter can be accomplished regardless of the orientation and compiling of the antenna and, once the tuning has been accomplished, the receiver will not be de-tuned by mislocation or misorientation of the antenna.

In general, a mismatch on an input to a gain state or an output can be tolerated, but not simultaneously. The present design simultaneously handles wide impedance fluctuations at both the input and the output of the preamplifier depending on placement of the receiver in a building structure. Normally, these wide fluctuations cause a receiver preamplifier to break into stubborn instability. Conventional approaches, such as feedback networks, fail to solve this problem. The preamplifier arrangement shown in FIG. 1 solves this problem.

Moreover, the arrangement shown in FIG. 1 provides a precisely defined small intermediate frequency based upon a transmitted frequency which may be much greater. For example, if the system in which the receiver in FIG. 1 is used is operated at 49 MHz, the arrangement of FIG. 1 allows an intermediate frequency for use by demodulator/receiver 43 of, for example, 93 KHz. In order to achieve this much lower intermediate frequency, crystal 50, which together with capacitor 44 form the local oscillator for the mixer of demodulator/receiver 43, is operated in its fundamental vibration mode which may, for example, be 49.752 MHz. A similar crystal in the transmitter which transmits the signal to the receiver of FIG. 1 as well as crystal filter 29, may be operated in their third overtone mode at 49.845 MHz, for example. If a 49.752 MHz signal is mixed with a 49.845 MHz signal, the result is a 93 KHz intermediate frequency signal.

The output of demodulator/receiver 43 is taken at pin 8 which is connected through resistor 51 and capacitor 52 to the base of buffer amplifier 53 in the form of a PNP transistor. Capacitor 54 is connected between the junction of resistor 51 and capacitor 52 and ground to act as a filter. The base of transistor 53 is connected through biasing resistors 55 and 56 to ground. Capacitor 57 is connected in parallel to resistor 55 for filtering out noise components in excess of the rated bandwidth. The emitter of transistor 53 is connected through resistor 58 to source 20. Resistor 58 selects the gain of amplifier 53. The data output terminal for providing demodulated data is provided at the collector of transistor 53.

Pin 6 is connected to the base of emitter follower 61 which has its emitter connected to a squelch output terminal. Capacitor 62 is connected between the base and collector of transistor 61 for preventing false triggering. The emitter of transistor 61 is also tied to ground through resistor 63. Diode 64 is connected from the data output terminal to the squelch output terminal for providing data squelch if needed.

In any arrangement involving substantial gain at a fundamental frequency, the output can be regeneratively coupled to the input. This is particularly true when the receiver and antenna are laid out on the same circuit board. Therefore, the receiver circuit shown in FIG. 1 can be isolated from the antenna by putting the receiver circuit in a closed metal box.

The embodiments of the invention in which an exclusive property or right is claimed are defined as follows:

1. A wireless superheterodyne receiver comprising:
   an antenna for receiving wireless transmissions;
   preamplifier means having an input connected to said antenna and having an output;
   crystal filter means having an input connected to the output of said preamplifier means and having an output, said crystal filter means having a first crystal tuned to the frequencies of the wireless transmissions, said crystal filter means comprising means for operating said first crystal in its third overtone mode;
   demodulator means having an input connected to the output of said crystal filter means, said demodulator means having a single mixer; and,
   oscillator means having a second crystal connected to said single mixer of said demodulator means, said oscillator means comprising means for operating said second crystal in its fundamental vibration mode,
   wherein said demodulator means supplies at an output a demodulated signal based upon said wireless transmission.

2. The receiver of claim 1 wherein said preamplifier means comprises a MOSFET having at least a drain terminal, a source terminal and a gate terminal.

3. The receiver of claim 2 wherein said source terminal of said MOSFET is connected directly to ground.

4. The receiver of claim 3 wherein said preamplifier means comprises a tuning coil connected between said antenna and said gate for boosting said received signal and a coil connected to said drain of said MOSFET to act as a load coil and isolation transformer.

5. The receiver of claim 4 wherein said crystal filter means comprises a first helical tuning coil connected between said MOSFET and said first crystal for impedance matching said first crystal to said MOSFET and for frequency tuning and a second helical tuning coil connected between said first crystal and said demodulator means for impedance matching said first crystal and said demodulator means.

6. The receiver of claim 1 wherein said preamplifier means comprises a tuning coil connected between said antenna and said preamplifier means for boosting said received signal and a further coil connected to said preamplifier means to act as a load coil and isolation transformer.

7. The receiver of claim 6 wherein said crystal filter means comprises a first helical tuning coil connected between said preamplifier means and said first crystal for impedance matching said first crystal to said preamplifier means and for frequency tuning and a second helical tuning coil connected between said first crystal and said demodulator means for impedance matching said first crystal and said demodulator means.

8. The receiver of claim 1 wherein said crystal filter means connected between said preamplifier means and said demodulator means comprises a single crystal.

9. The receiver of claim 8 wherein said preamplifier means comprises a MOSFET having at least a drain terminal, a source terminal and a gate terminal.

10. The receiver of claim 9 wherein said source terminal of said MOSFET is connected directly to ground.

11. The receiver of claim 10 wherein said preamplifier means comprises a tuning coil connected between said antenna and said gate for boosting said received signal and a coil connected to said drain of said MOSFET to act as a load coil and isolation transformer.

12. The receiver of claim 11 wherein said crystal filter means comprises a first helical tuning coil connected between said MOSFET and said first crystal for impedance matching said first crystal to said MOSFET and for frequency tuning and a second helical tuning coil connected between said first crystal and said demodulator means for impedance matching said first crystal and said demodulator means.

13. A wireless superheterodyne receiver comprising an antenna for receiving wireless transmissions;
   preamplifier means having an input connected to said antenna and having an output;
   crystal filter means having an input connected to the output of said preamplifier means and having an output, said crystal filter means having a first crystal tuned to the frequencies of the wireless transmissions;
   demodulator means having an input connected to the output of said crystal filter means, said demodulator means having a single mixer;
   oscillator means having a second crystal connected to said single mixer of said demodulator means;
   said demodulator means supplying at an output a demodulated signal based upon said wireless transmission; and,
   said crystal filter means comprising a first helical tuning coil connected between said preamplifier means and said first crystal for impedance matching said first crystal to said preamplifier means and for frequency tuning, and a second helical tuning coil connected between said first crystal and said demodulator means for impedance matching said first crystal and said demodulator means.

* * * * *